United States Patent
Washnock et al.

(10) Patent No.: US 10,829,145 B2
(45) Date of Patent: Nov. 10, 2020

(54) VEHICLE STEERING

(71) Applicant: Ford Global Technologies, LLC, Dearborn, MI (US)

(72) Inventors: Joseph Washnock, Canton, MI (US); Jack E. Barry, Dearborn, MI (US); Soungjin Wou, Novi, MI (US); Garry Robert Smith, Grosse Pointe Park, MI (US); Jennifer Laz, West Bloomfield, MI (US); James Philip Cooper, Milford, MI (US); Daniel Steven Payne, Southgate, MI (US); Rohit Kadam, Windsor (CA)

(73) Assignee: Ford Global Technology, LLC, Dearborn, MI (US)

( * ) Notice: Subject to any disclaimer, the term of this patent is extended or adjusted under 35 U.S.C. 154(b) by 339 days.

(21) Appl. No.: 16/058,311

(22) Filed: Aug. 8, 2018

(65) Prior Publication Data

US 2020/0047793 A1 Feb. 13, 2020

(51) Int. Cl.
| | |
|---|---|
| *B62D 5/04* | (2006.01) |
| *F16H 19/04* | (2006.01) |
| *F16H 1/20* | (2006.01) |
| *B62D 5/00* | (2006.01) |
| *B62D 3/12* | (2006.01) |

(52) U.S. Cl.
CPC .......... *B62D 5/0442* (2013.01); *B62D 3/12* (2013.01); *B62D 5/001* (2013.01); *B62D 5/0403* (2013.01); *B62D 5/0421* (2013.01); *F16H 1/20* (2013.01); *F16H 19/04* (2013.01)

(58) Field of Classification Search
CPC ........ B62D 5/0442; B62D 3/12; B62D 5/001; B62D 5/0403; B62D 5/0421; F16H 1/20; F16H 19/04
See application file for complete search history.

(56) References Cited

U.S. PATENT DOCUMENTS

| | | | |
|---|---|---|---|
| 4,986,381 A | 1/1991 | Morishita et al. | |
| 5,762,162 A | 6/1998 | Bodtker | |
| 7,789,191 B2 | 9/2010 | Deshmukh et al. | |
| 2008/0023257 A1 | 1/2008 | Budaker et al. | |
| 2014/0109702 A1* | 4/2014 | Kometani | B62D 3/123 74/30 |
| 2018/0201304 A1* | 7/2018 | Miyoshi | B62D 5/0424 |

FOREIGN PATENT DOCUMENTS

| | | |
|---|---|---|
| CN | 108032900 A | 5/2018 |
| DE | 102015120207 A1 | 5/2017 |

* cited by examiner

*Primary Examiner* — Jacob D Knutson
(74) *Attorney, Agent, or Firm* — Ray Coppiellie; Hanley, Flight & Zimmerman, LLC (57) ABSTRACT

A steering apparatus includes a first pinion, an internal gear engaged with the first pinion, a second pinion fixed relative to the internal gear, a first gear engaged with the second pinion, a third pinion fixed relative to the first gear, and a steering rack meshed with the third pinion.

20 Claims, 7 Drawing Sheets

VEHICLE STEERING

BACKGROUND

A steering system of a vehicle controls the turning of wheels of the vehicle and thus determines a direction that the vehicle will drive. The steering system can be a rack-and-pinion system with electric power-assisted steering, a steer-by-wire system, etc. The steering system can include an electronic control unit (ECU) or the like that is in communication with and receives input from a computer and/or a human driver. The human driver may control the steering system via, e.g., a steering wheel.

DETAILED DESCRIPTION

A steering apparatus includes a first pinion, an internal gear engaged with the first pinion, a second pinion fixed relative to the internal gear, a first gear engaged with the second pinion, a third pinion fixed relative to the first gear, and a steering rack meshed with the third pinion.

The first gear may be meshed with the second pinion.
The internal gear may be meshed with the first pinion.
The first gear may be a helical gear.
The first pinion may be rotatable about a first axis, and the third pinion may be rotatable about a third axis parallel to the first axis.
The second pinion may be rotatable about a second axis, and the third pinion may be rotatable about a third axis parallel to the second axis.
The third pinion may be rotatable about an axis that is oriented substantially vertically.
The first gear may be disposed above the steering rack.
The internal gear may be disposed above the first gear.
The steering apparatus may further include a motor drivably coupled to the first pinion. The steering apparatus may further include a steering wheel, and the motor is electronically coupled to the steering wheel. The motor may be mechanically isolated from the steering wheel.
The steering apparatus may further include a rack housing, and the steering rack and the third pinion may be disposed in the rack housing. The first gear and the second pinion may be disposed in the rack housing.
The steering apparatus may further include an internal-gear housing, and the internal gear may be disposed in the internal-gear housing. The internal-gear housing may extend completely above the first gear.
The steering apparatus may further include a rack housing including a bore, and the internal-gear housing may include a pivot pin rotatably engaged with the bore.
The steering apparatus may further include a top cover extending completely above the internal gear. The internal-gear housing may include a bore, and the top cover may include a pivot pin rotatably engaged with the bore.
The steering apparatus may further include a yoke engaged with the steering rack opposite the third pinion.
With reference to the Figures, a steering apparatus 30 for a vehicle 32 includes a first pinion 34, an internal gear 36 engaged with the first pinion 34, a second pinion 38 fixed relative to the internal gear 36, a first gear 40 engaged with the second pinion 38, a third pinion 42 fixed relative to the first gear 40, and a steering rack 44 meshed with the third pinion 42. For the purposes of this disclosure, "engaged" in reference to gears means that the gears are operatively connected, i.e., movement of one gear imparts movement to the other gear. For the purposes of this disclosure, "meshed" in reference to gears means that the teeth of the gears are interspersed so that movement of one gear directly imparts movement to the other gear.

The steering apparatus 30 allows for vertical stacking of its components, which can help the packaging of components of the vehicle 32. The arrangement of the steering apparatus 30 can allow versatility in placing the steering apparatus 30 relative to other components of the vehicle 32. The steering apparatus 30 may not need to be cantilevered and thus has a more secure placement in the vehicle 32. Moreover, the steering apparatus 30 can produce high gear-reduction ratios.

Figure 1:
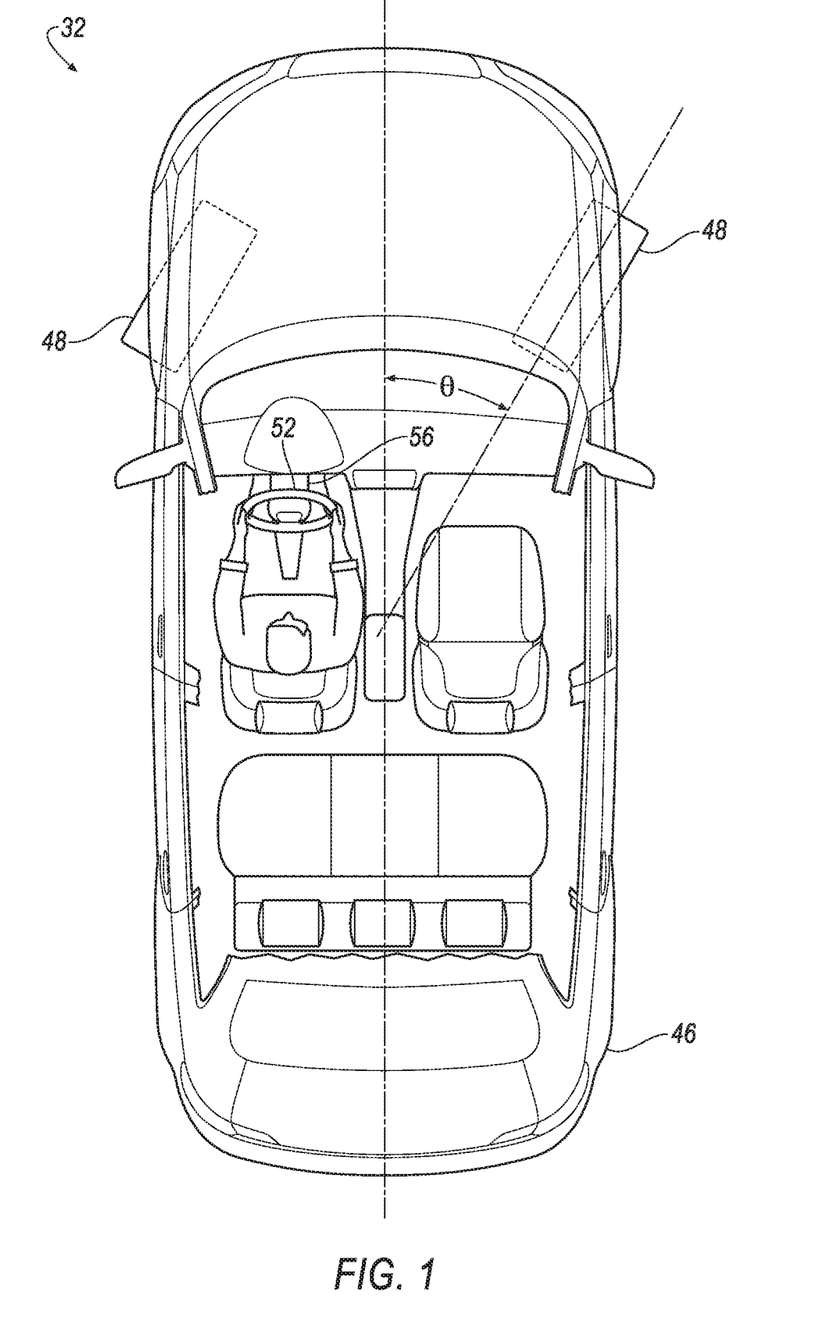
FIG. 1 is a top view of a vehicle.

With reference to FIG. 1, the vehicle 32 may be any passenger or commercial automobile such as a car, a truck, a sport utility vehicle, a crossover vehicle, a van, a minivan, a taxi, a bus, etc.

The vehicle 32 includes a frame 46. The vehicle 32 may be of a unibody construction, in which the frame 46 and a body of the vehicle 32 are a single component, as shown in FIG. 1. The vehicle 32 may, alternatively, be of a body-on-frame construction, in which the frame 46 supports a body that is a separate component from the frame 46. The frame 46 and body may be formed of any suitable material, for example, steel, aluminum, etc.

The vehicle 32 includes wheels 48. The wheels 48 control a driving direction of the vehicle 32. A position of the wheels 48, e.g., turned to a right or a left relative to a forward-driving direction, controls the driving direction, e.g., when the wheels 48 are turned to the right the vehicle 32 may navigate to the right. The position of the wheels 48 defines the steering angle θ, i.e., an amount of deviation of the wheels 48 to the right or left of center.

Figure 2:
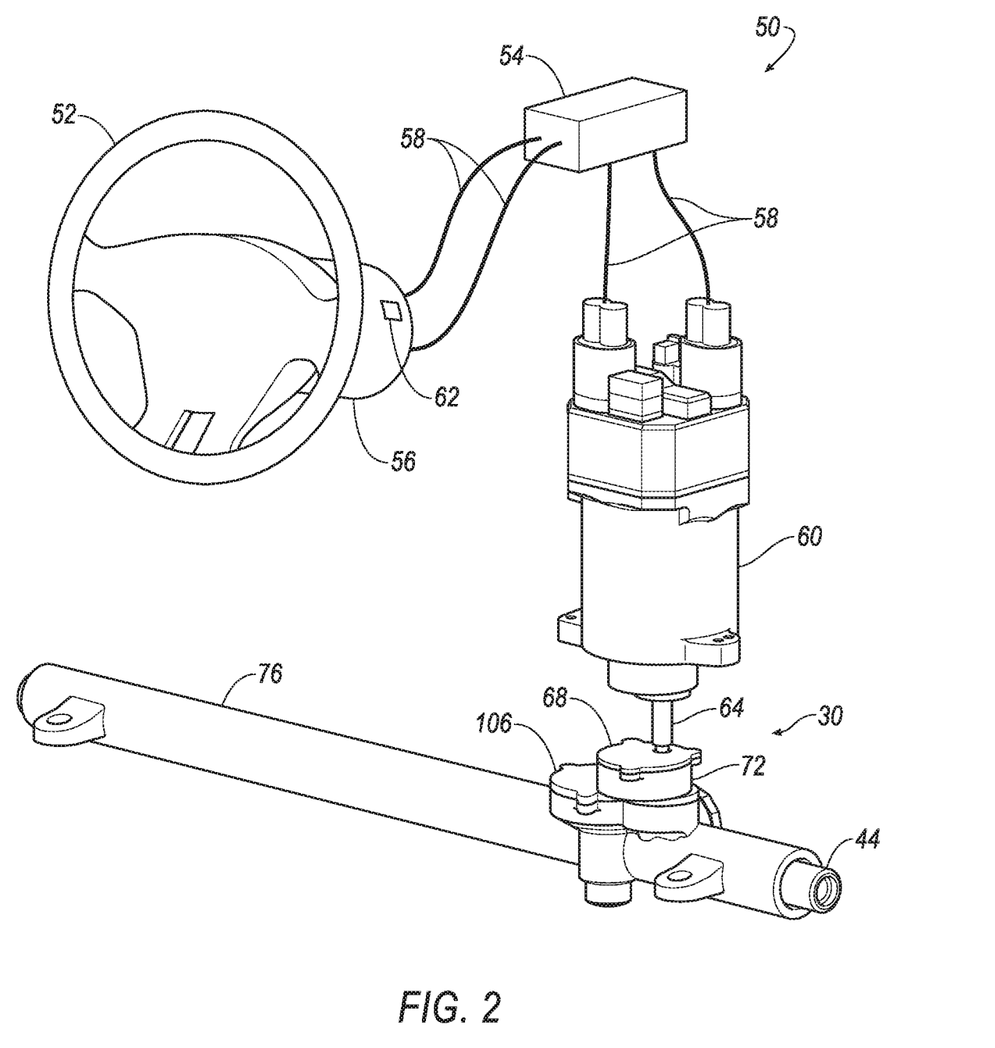
FIG. 2 is a perspective view of a steering system of the vehicle.

With reference to FIG. 2, a steering system 50 controls the steering angle θ of the wheels 48. The steering system 50 may be in communication with and receive input from a steering wheel 52 and/or a computer 54. The steering system 50 may be an electric power-assisted system, a steer-by-wire system, or any other suitable system. For example, turning the steering wheel 50 may provide torque to the steering system 50 for turning the wheels 48, and the steering system 50 may also provide an assist mechanism that provides additional power to turn the wheels 48 in a direction indicated by an occupant turning the steering wheel 52. Alternatively, the steering system 50 may be a standalone system that is mechanically isolated from the steering wheel 52 and provides all the power for turning the wheels 48.

The steering wheel 52 allows an operator to steer the vehicle 32 by transmitting rotation of the steering wheel 52 to movement of the steering rack 44. The steering wheel 52 may be, e.g., a rigid ring fixedly attached to a steering column 56. The steering wheel 52 is rotatable about the steering column 56 relative to the frame 46.

The computer 54 may be a microprocessor-based controller implemented via circuits, chips, or other electronic components. For example, the computer 54 may include a processor, memory, etc. The memory of the computer 54 may include memory for storing instructions executable by the processor as well as for electronically storing data and/or databases. Although one computer 54 is shown for ease of illustration, it is to be understood that the computer 54 could include, and various operations described herein could be carried out by, one or more computing devices.

A communication network 58 may facilitate wired or wireless communication among the components of the steering system 50, e.g., the computer 54, a motor 60, a position sensor 62, etc. The communication network 58 includes hardware, such as a communication bus, for facilitating communication among the components. The communication network 58 may facilitate wired or wireless communication among the components in accordance with a number of communication protocols such as controller area network (CAN), Ethernet, WiFi, Local Interconnect Network (LIN), and/or other wired or wireless mechanisms.

The computer 54 may command the motor 60 to move the steering rack 44, e.g., in a steer-by-wire steering system. The motor 60 moves the steering rack 44 via the steering apparatus 30, as described in detail below. The motor 60 is electronically coupled to the steering wheel 52. For example, a rotational position of the steering column 56 may be detected by the computer 54 via the position sensor 62. The position sensor 62 is designed to detect a rotational position of the steering column 56, e.g., a proximity sensor, a Hall effect sensor, a rotational transducer, a potentiometer, etc. The computer 54 may be in communication with the motor 60. The motor 60 may be mechanically isolated from the steering wheel 52. For the purposes of this disclosure, "mechanically isolated" means that there is no unbroken transfer of mechanical motion from one component to another.

The memory of the computer 54 stores instructions executable by the processor to actuate the motor 60 to control the steering angle θ of the wheels 48 based on a detected position, e.g., a rotational position, of the steering wheel 52. For example, the computer 54 may receive information via the communication network 58 from the position sensor 62 indicating the detected position of the steering column 56 fixed to the steering wheel 52. Based on the detected position of the steering wheel 52, the computer 54 may transmit an instruction to the motor 60 indicating a rotational direction, a magnitude of rotation, etc., for the motor 60 to provide to a shaft 64. For example, when the detected position indicates that the steering wheel 52 and steering column 56 have been turned to a certain position or in a certain direction, the computer 54 may actuate the motor 60 to move the steering rack 44 and change the steering angle θ to correspond to the detected position. Alternatively or additionally, the computer 54 may receive or choose the steering angle θ from an autonomous-driving algorithm, as is known.

The motor 60 converts electrical power into rotational mechanical motion. The motor 60 may be any suitable motor for imparting rotational motion with sufficient torque to turn the wheels 48, e.g., an electric motor such as an electrically excited DC motor, a permanent magnet DC motor, a brushless DC motor, etc.

Figure 3:
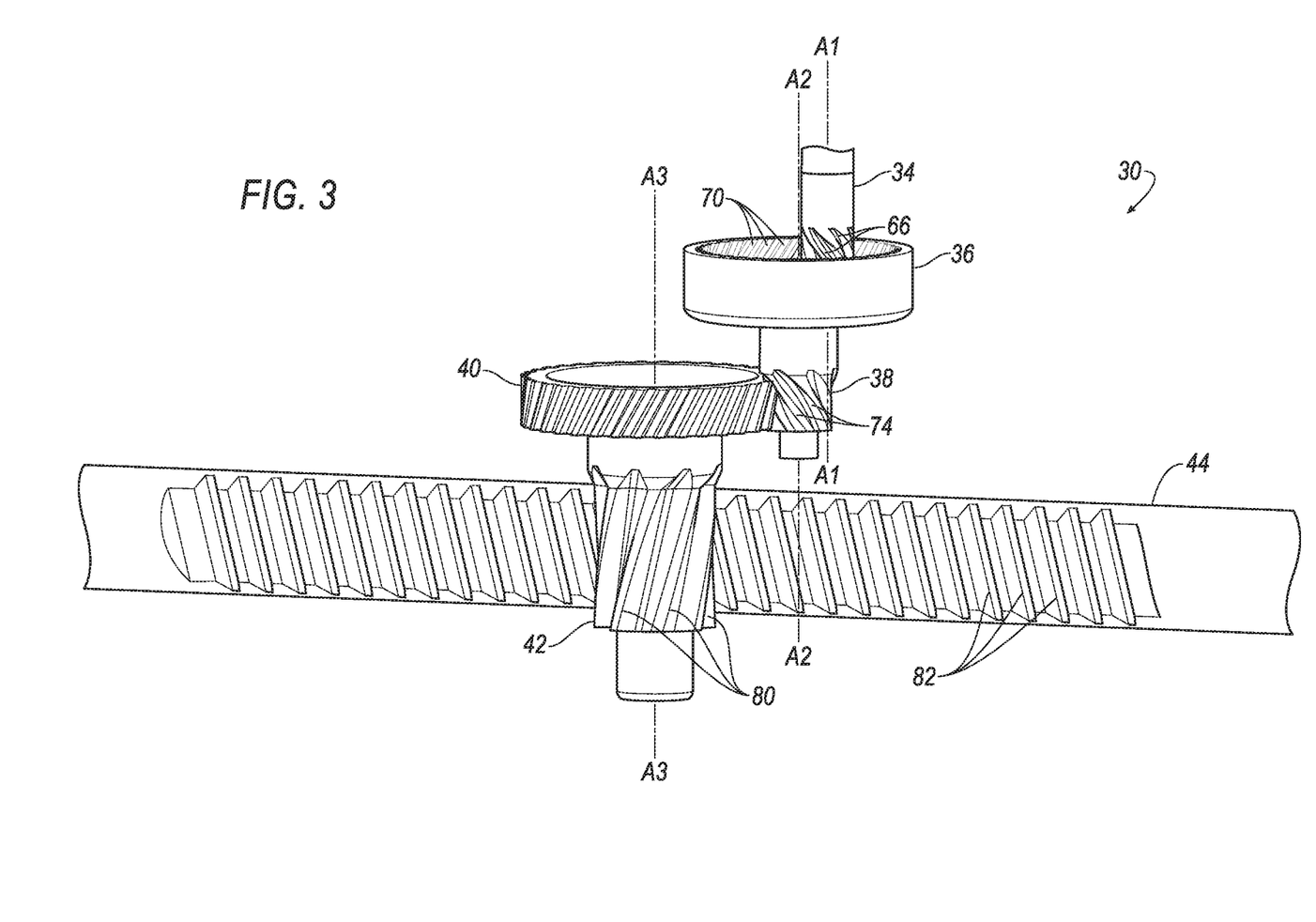
FIG. 3 is a perspective view of a gear system of the steering system.
Figure 4:
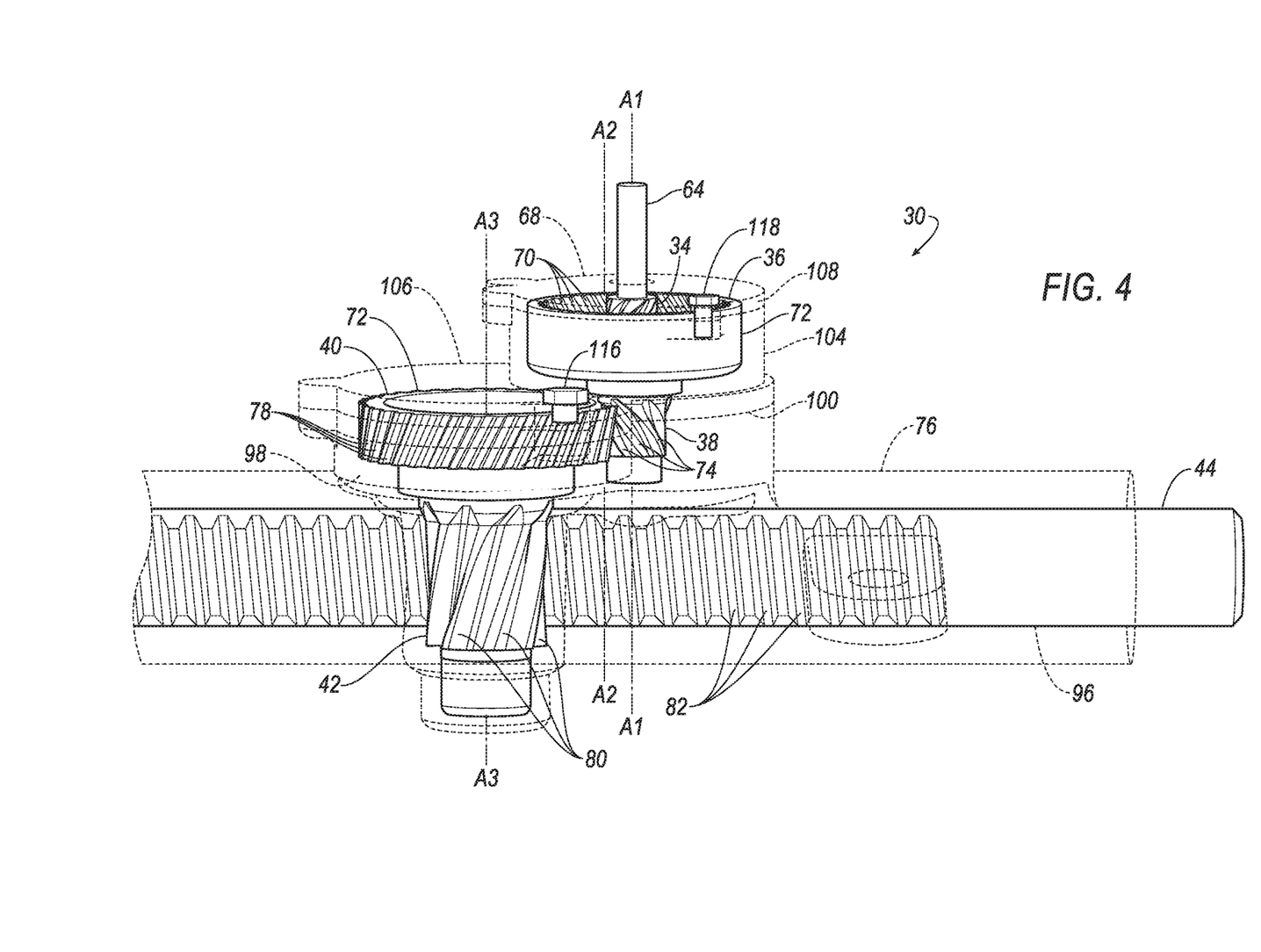
FIG. 4 is a perspective view of the steering system.
Figure 5:
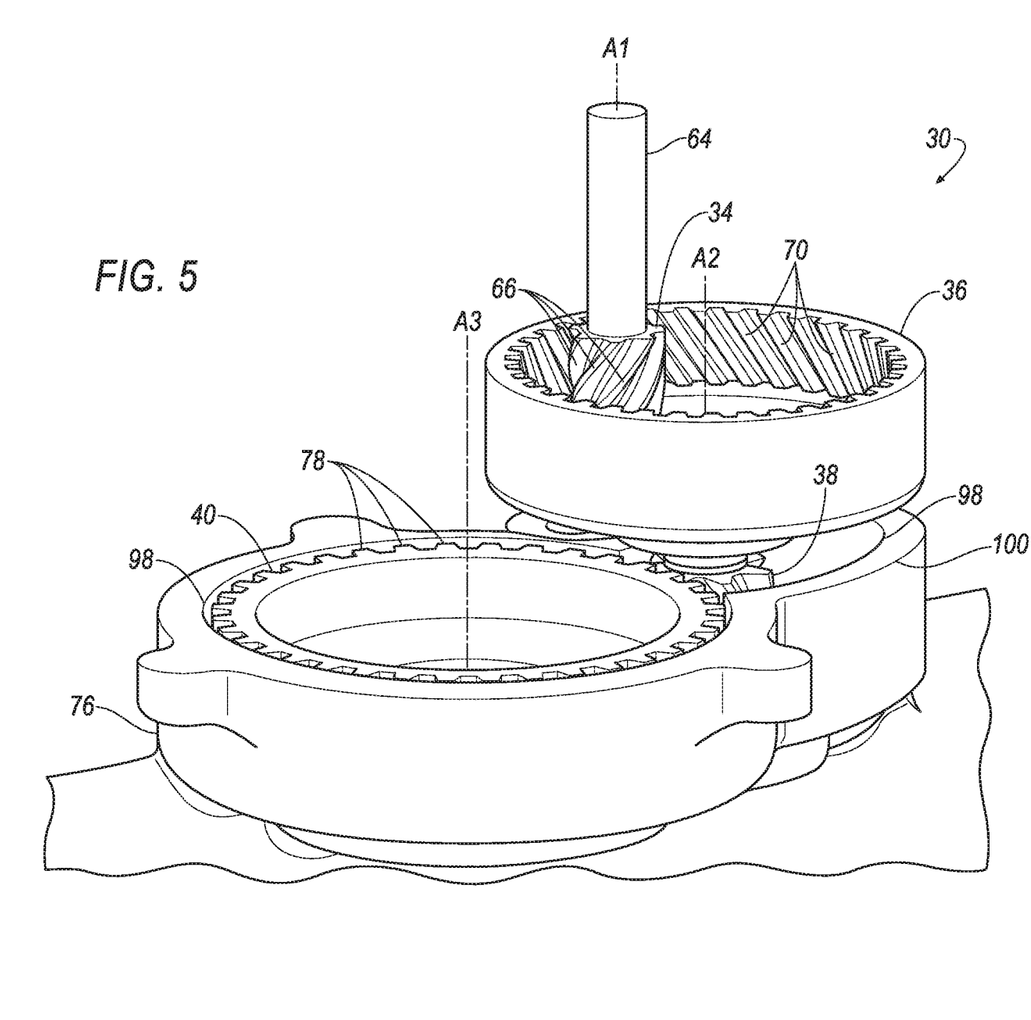
FIG. 5 is a perspective view of a portion of the steering system with the gear system exposed for illustration.

With reference to FIGS. 3-5, the motor 60 is drivably coupled to the first pinion 34, e.g., via the shaft 64. The motor 60 converts electrical energy into rotational motion of the first pinion 34. The first pinion 34 defines and rotates about a first axis of rotation A1. In other words, the first pinion 34 is rotatable about the first axis A1. The motor 60 is engaged with the first pinion 34 to transfer torque therebetween. To put it another way, rotation of the shaft 64 of the motor 60 causes rotation of the first pinion 34, and vice versa. For example, the shaft 64 of the motor 60 may be fixed relative to the first pinion 34 such that rotation of the shaft 64 causes rotation of the first pinion 34. For example, the first pinion 34 may be fixed to the shaft 64 via a set-screw or other fastener, welding, mechanical interlock, e.g., splines, keyed slots, etc. For another example, the first pinion 34 and the shaft 64 may be one monolithic unit and may be connected to the motor 60 via a set-screw or other fastener, welding, mechanical interlock, e.g., splines, keyed slots, etc.

The first pinion 34 includes a plurality of gear teeth 66. The gear teeth 66 extend outward, e.g., radially away from the first axis A1 of the first pinion 34. The gear teeth 66 may be arranged circumferentially about the first pinion 34. The gear teeth 66 may be, e.g., straight or helical. The first pinion 34 may be rotatably supported by a top cover 68 such that the first pinion 34 may rotate about the first axis A1.

The internal gear 36 includes a plurality of gear teeth 70. The internal gear 36 defines a second axis of rotation A2. In other words, the internal gear 36 is rotatable about the second axis A2. The gear teeth 70 extend inwardly, e.g., radially toward the second axis A2 of the internal gear 36. The gear teeth 70 may be arranged circumferentially about the internal gear 36, e.g., about the axis A2. The gear teeth 70 may be, e.g., straight or helical. The internal gear 36 may be rotatably supported by an internal-gear housing 72 such that the internal gear 36 may rotate about the second axis A2. The internal gear 36 may be disposed above the steering rack 44, e.g., relative to a top and bottom of the vehicle 32. The second axis A2 of the internal gear 36 and the first axis A1 of the first pinion 34 may be parallel.

The first pinion 34 is engaged with the internal gear 36. For example, the first pinion 34 is meshed with the internal gear 36. The mesh between the first pinion 34 and the internal gear 36 transfers force from the first pinion 34 to the internal gear 36, e.g., such that rotation of the first pinion 34 causes rotation of the internal gear 36, and vice versa. For example, the gear teeth 66 of the first pinion 34 may be meshed with the gear teeth 70 of the internal gear 36. Force may be transferred therebetween by the gear teeth 66 of the first pinion 34 contacting the gear teeth 70 of the internal gear 36.

The second pinion 38 is fixed relative to the internal gear 36. The attachment of the second pinion 38 to the internal gear 36 transfers force therebetween. To put it another way, rotation of the internal gear 36 causes rotation of the second pinion 38, and vice versa. For example, the internal gear 36 and the second pinion 38 may be coaxial, i.e., both rotatable about the second axis A2. For example, the second pinion 38 may be fixed to the internal gear 36, e.g., via welding, etc. As another example, the second pinion 38 and the internal gear 36 may be fixed to a common shaft. As one more example, the second pinion 38 and the internal gear 36 may be monolithic, i.e., a single piece of material with no seams, joints, fasteners, or adhesives holding the second pinion 38 and the internal gear 36 together.

The second pinion 38 defines the second axis of rotation A2. The second pinion 38 includes a plurality of gear teeth 74. The gear teeth 74 extend outward, e.g., radially away from the second axis A2 of the second pinion 38. The gear teeth 74 may be arranged circumferentially about the second pinion 38. The gear teeth 74 may be, e.g., straight or helical.

The second pinion 38 may be rotatably supported by a rack housing 76 such that the second pinion 38 may rotate about the second axis A2. The second pinion 38 may be disposed above the steering rack 44, e.g., relative to a top and bottom of the vehicle 32.

The first gear 40 defines a third axis of rotation A3. In other words, the first gear 40 is rotatable about the third axis A3. The first gear 40 includes a plurality of gear teeth 78. The gear teeth 78 extend outward, e.g., radially away from the third axis A3 of the first gear 40. The gear teeth 78 may be arranged circumferentially about the first gear 40. The gear teeth 78 may be, e.g., straight, i.e., the first gear 40 is a spur gear; or helical, i.e., the first gear 40 is a helical gear. The first gear 40 may be rotatably supported by the rack housing 76 such that the first gear 40 may rotate about the third axis A3. The first gear 40 may be disposed above the steering rack 44, e.g., relative to a top and bottom of the vehicle 32.

The first gear 40 is engaged with the second pinion 38. For example, the first gear 40 is meshed with the second pinion 38. The mesh between the first gear 40 and the second pinion 38 transfers force from the first gear 40 to the second pinion 38, e.g., such that rotation of the first gear 40 causes rotation of the second pinion 38, and vice versa. For example, the gear teeth 78 of the first gear 40 may be meshed with the gear teeth 74 of the second pinion 38. Force may be transferred therebetween by the gear teeth 78 of the first gear 40 contacting the gear teeth 74 of the second pinion 38.

With reference to FIGS. 3 and 4, the third pinion 42 is fixed relative to the first gear 40. The attachment of the third pinion 42 to the first gear 40 transfers force therebetween. To put it another way, rotation of the first gear 40 causes rotation of the third pinion 42, and vice versa. For example, the third pinion 42 may be fixed to the first gear 40, e.g., via welding, etc. As another example, the third pinion 42 and the first gear 40 may be fixed to a common shaft. As one more example, the third pinion 42 and the first gear 40 may be monolithic, i.e., a single piece of material with no seams, joints, fasteners, or adhesives holding the third pinion 42 and the first gear 40 together.

The third pinion 42 defines the third axis of rotation A3. In other words, the third pinion 42 is rotatable about the third axis A3. The third pinion 42 includes a plurality of gear teeth 80. The gear teeth 80 extend outward, e.g., radially away from the third axis A3 of the third pinion 42. The gear teeth 80 may be arranged circumferentially about the third pinion 42. The gear teeth 80 may be, e.g., straight or helical. The third pinion 42 may be rotatably supported by the rack housing 76 such that the third pinion 42 may rotate about the third axis A3. The third pinion 42 may be disposed above the steering rack 44, e.g., relative to a top and bottom of the vehicle 32.

The steering rack 44 is designed to control the steering angle θ of the wheels 48. For example, the steering rack 44 may be connected to the wheels 48 via tie-rods, steering knuckles, etc., and may be movable toward a right and a left of the vehicle 32. Movement of the steering rack 44 may change the steering angle θ. The steering rack 44 may be elongated in a lateral direction relative to the vehicle 32. The steering rack 44 may include a plurality of gear teeth 82 arranged along a length of the steering rack 44. The steering rack 44 may be slidably supported by the rack housing 76. For example, the steering rack 44 may slide within the rack housing 76 as the steering rack 44 moves to change the steering angle θ.

The third pinion 42 is meshed with the steering rack 44. The mesh between the third pinion 42 and the steering rack 44 transfers force from the third pinion 42 to the steering rack 44, e.g., such that rotation of the third pinion 42 causes movement of the steering rack 44, and vice versa. For example, the gear teeth 80 of the third pinion 42 may be meshed with the gear teeth 82 of the steering rack 44. Force may be transferred therebetween by gear teeth 80 of the third pinion 42 contacting gear teeth 82 of the steering rack 44.

Figure 6:
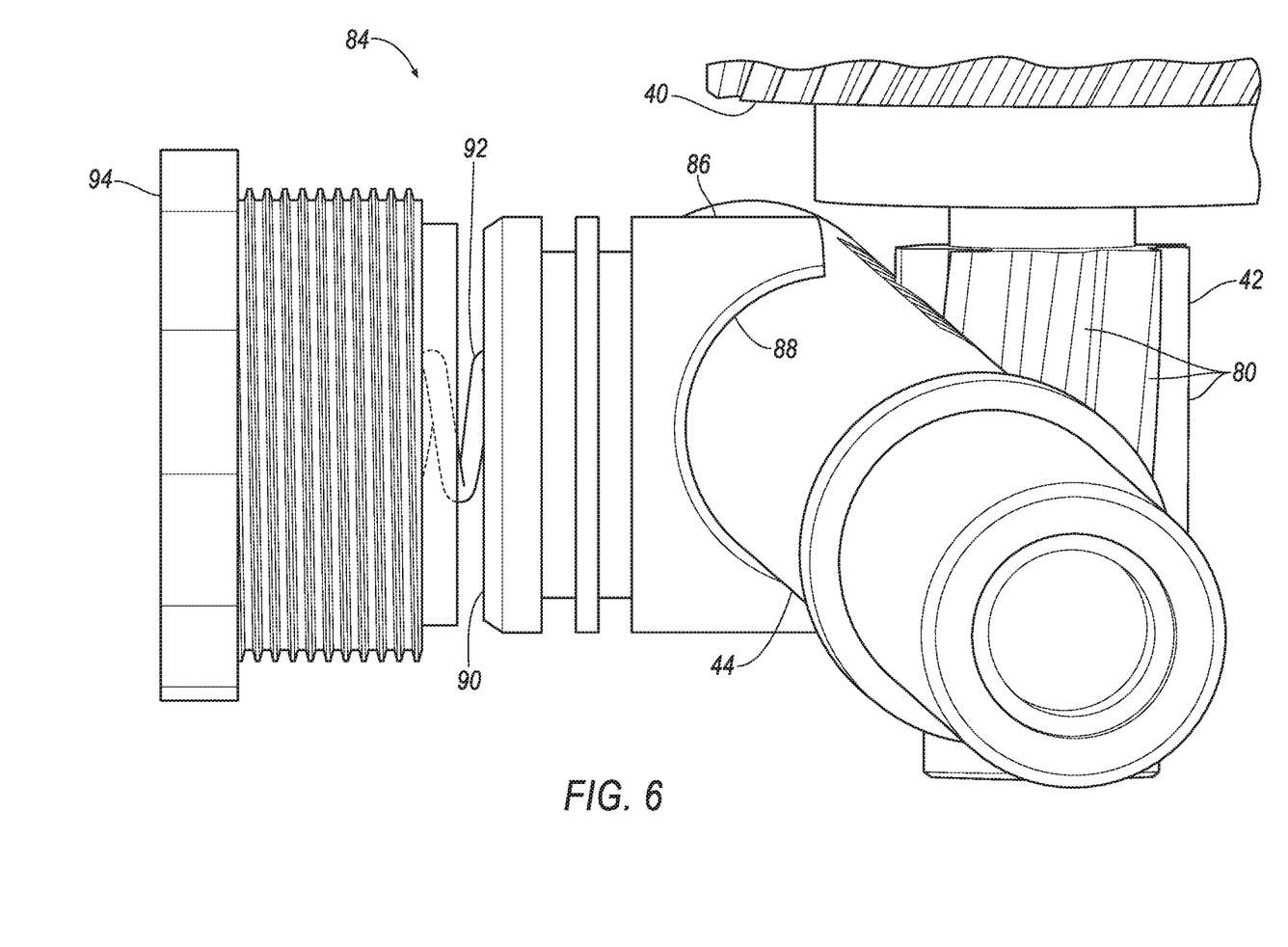
FIG. 6 is a side perspective view of a portion of the gear system.

With reference to FIG. 6, the steering system 50 may include a yoke 84. The yoke 84 helps maintain the mesh between the steering rack 44 and the third pinion 42. The yoke 84 may be supported by the rack housing 76. The yoke 84 operatively engages the steering rack 44 opposite the third pinion 42. For example, the yoke 84 may include yoke member 86 having a reaction surface 88 opposite a distal end 90. The reaction surface 88 may abut the steering rack 44 opposite the third pinion 42. In other word, the steering rack 44 may be directly between the yoke member 86 and the third pinion 42. A bearing, a bushing, or other friction reducing component may be between the reaction surface 88 and the steering rack 44.

The yoke 84 may include a spring 92. The spring 92 may be located between the yoke member 86 and the rack housing 76. For example, the spring 92 may be between the distal end 90 of the yoke member 86 and a plug 94 attached to the rack housing 76. The spring 92 biases the yoke member 86 toward the steering rack 44 and the third pinion 42. Force from the spring 92 and yoke member 86 on the steering rack 44 biases the gear teeth 82 of the steering rack 44 and the gear teeth 80 of the third pinion 42 toward each other, e.g., into mesh with each other.

With reference to FIGS. 2, 4, and 5, the rack housing 76 supports the steering rack 44, the third pinion 42, the first gear 40, and the second pinion 38. The rack housing 76 also supports the internal-gear housing 72 and the top cover 68. The steering rack 44, the third pinion 42, the first gear 40, and the second pinion 38 are disposed in the rack housing 76. The rack housing 76 may be fixed relative to the frame 46 of the vehicle 32. The rack housing 76 may be metal or any other sufficiently strong and tough material. The rack housing 76 may include a tubular chamber 96 in which the steering rack 44 is disposed. The steering rack 44 is movable along the tubular chamber 96. The rack housing 76 may include an upper chamber 98 in which the first gear 40 and second pinion 38 are disposed. The upper chamber 98 may be vertically above the tubular chamber 96 relative to the vehicle 32. The rack housing 76 may include a top surface 100. The top surface 100 may be flat. The upper chamber 98 may be open at the top surface 100. The top surface 100 may include a first bore 102.

Figure 7:
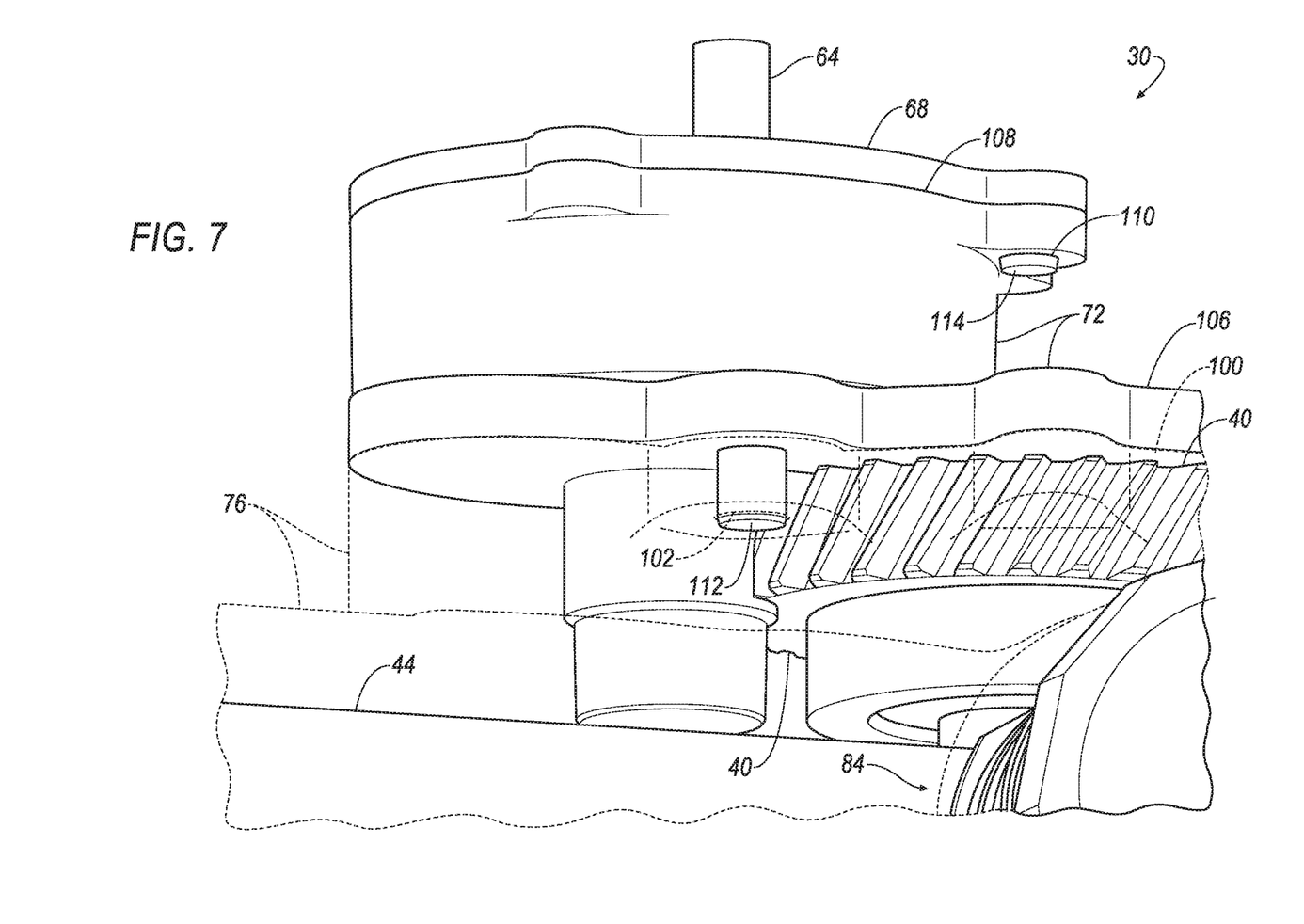
FIG. 7 is a rear underside perspective view of a portion of the steering system.

With reference to FIGS. 2, 4, and 7, the internal-gear housing 72 supports the internal gear 36. The internal-gear housing 72 also supports the top cover 68. The internal gear 36 is disposed in the internal-gear housing 72. The internal-gear housing 72 may be metal or any other sufficiently strong and tough material, e.g., the same material as the rack housing 76. The internal gear 36 housing may extend completely above the top surface 100 of the rack housing 76. The internal-gear housing 72 may extend completely above the first gear 40. The internal-gear housing 72 may include an internal-gear-housing chamber 104 in which the internal gear 36 is disposed. The internal-gear housing 72 may include a plate portion 106 extending away from the internal-gear-housing chamber 104 and extending above the first gear 40. The plate portion 106 may be flush with the top surface 100 of the rack housing 76. The internal-gear housing 72 may include a top surface 108. The top surface 108 may be flat. The internal-gear-housing chamber 104 may open at the top surface 108 of the internal-gear housing 72. The top surface 108 may include a second bore 110.

With reference to FIG. 7, the internal-gear housing 72 may be fixed to the rack housing 76. The internal-gear housing 72 includes a first pivot pin 112 rotatably engaged with the first bore 102. The first pivot pin 112 extends downward from the internal-gear housing 72. During assembly of the steering system 50, the first pivot pin 112 may be inserted into the first bore 102, and the internal-gear housing 72, the internal gear 36, and the second pinion 38 may be rotated together into a position in which the gear teeth 74 of the second pinion 38 are meshed with the gear teeth 78 of the first gear 40. Then one or more additional bolts 116 may be added to fix the internal-gear housing 72 relative to the rack housing 76, as shown in FIG. 4.

With reference to FIGS. 2, 4, and 7, the top cover 68 may extend completely over the internal gear 36. The top cover 68 may extend completely over the top surface 108 of the internal-gear housing 72. The top cover 68 may have a flat, plate-like shape. The top cover 68 may be flush with the top surface 108 of the internal-gear housing 72. The top cover 68 may be metal or any other sufficiently strong and tough material, e.g., the same material as the rack housing 76 and/or the internal-gear housing 72.

With reference to FIG. 7, the top cover 68 may be fixed to the internal-gear housing 72. The top cover 68 includes a second pivot pin 114 rotatably engaged with the second bore 110. The second pivot pin 114 extends downward from the top cover 68. During assembly of the steering system 50, the second pivot pin 114 may be inserted into the second bore 110, and the top cover 68 and the first pinion 34 may be rotated together into a position in which the gear teeth 66 of the first pinion 34 are meshed with the gear teeth 70 of the internal gear 36. Then one or more additional bolts 118 may be added to fix the top cover 68 to the internal-gear housing 72, as shown in FIG. 4.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance or order. Many modifications and variations of the present disclosure are possible in light of the above teachings, and the disclosure may be practiced otherwise than as specifically described.

What is claimed is:

1. A steering apparatus comprising:
a first pinion;
an internal gear engaged with the first pinion;
a second pinion fixed relative to the internal gear;
a first gear engaged with the second pinion;
a third pinion fixed relative to the first gear; and
a steering rack meshed with the third pinion.

2. The steering apparatus of claim 1, wherein the first gear is meshed with the second pinion.

3. The steering apparatus of claim 1, wherein the internal gear is meshed with the first pinion.

4. The steering apparatus of claim 1, wherein the first gear is a helical gear.

5. The steering apparatus of claim 1, wherein the first pinion is rotatable about a first axis, and the third pinion is rotatable about a third axis parallel to the first axis.

6. The steering apparatus of claim 1, wherein the second pinion is rotatable about a second axis, and the third pinion is rotatable about a third axis parallel to the second axis.

7. The steering apparatus of claim 1, wherein the third pinion is rotatable about an axis that is oriented substantially vertically.

8. The steering apparatus of claim 1, wherein the first gear is disposed above the steering rack.

9. The steering apparatus of claim 1, wherein the internal gear is disposed above the first gear.

10. The steering apparatus of claim 1, further comprising a motor drivably coupled to the first pinion.

11. The steering apparatus of claim 10, further comprising a steering wheel, wherein the motor is electronically coupled to the steering wheel.

12. The steering apparatus of claim 11, wherein the motor is mechanically isolated from the steering wheel.

13. The steering apparatus of claim 1, further comprising a rack housing, wherein the steering rack and the third pinion are disposed in the rack housing.

14. The steering apparatus of claim 13, wherein the first gear and the second pinion are disposed in the rack housing.

15. The steering apparatus of claim 1, further comprising an internal-gear housing, wherein the internal gear is disposed in the internal-gear housing.

16. The steering apparatus of claim 15, wherein the internal-gear housing extends completely above the first gear.

17. The steering apparatus of claim 15, further comprising a rack housing including a bore, wherein the internal-gear housing includes a pivot pin rotatably engaged with the bore.

18. The steering apparatus of claim 15, further comprising a top cover extending completely above the internal gear.

19. The steering apparatus of claim 18, wherein the internal-gear housing includes a bore, and the top cover includes a pivot pin rotatably engaged with the bore.

20. The steering apparatus of claim 1, further comprising a yoke engaged with the steering rack opposite the third pinion.

* * * * *